(12) United States Patent
Tazaki

(10) Patent No.: US 8,324,140 B2
(45) Date of Patent: *Dec. 4, 2012

(54) REFRIGERATING MACHINE OIL COMPOSITION FOR CARBON DIOXIDE REFRIGERANT

(75) Inventor: Toshinori Tazaki, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 395 days.

This patent is subject to a terminal disclaimer.

(21) Appl. No.: 11/338,706

(22) Filed: Jan. 25, 2006

(65) Prior Publication Data

US 2006/0128576 A1    Jun. 15, 2006

Related U.S. Application Data

(60) Division of application No. 10/406,213, filed on Apr. 4, 2003, now Pat. No. 7,018,961, which is a continuation of application No. 10/019,291, filed as application No. PCT/JP00/04143 on Jun. 23, 2000, now abandoned.

(30) Foreign Application Priority Data

Jul. 6, 1999 (JP) ..................................... 11-191189

(51) Int. Cl.
*C10M 107/32* (2006.01)
*C10M 107/34* (2006.01)

(52) U.S. Cl. ............. 508/579; 508/462; 252/67; 252/68

(58) Field of Classification Search ............ 252/67, 252/68; 508/579, 462
See application file for complete search history.

(56) References Cited

U.S. PATENT DOCUMENTS

| 2,807,155 | A |   | 9/1957 | Williamitis |
|---|---|---|---|---|
| 4,755,316 | A |   | 7/1988 | Magid et al. |
| 5,801,132 | A | * | 9/1998 | Kaneko et al. ................. 508/579 |
| 5,858,266 | A | * | 1/1999 | Kaneko ........................... 252/68 |
| 5,964,581 | A | * | 10/1999 | Iizuka et al. ................. 417/410.3 |
| 6,013,609 | A | * | 1/2000 | Katafuchi ..................... 508/206 |
| 6,074,573 | A | * | 6/2000 | Kaneko ........................... 252/68 |
| 6,117,356 | A | * | 9/2000 | Powell et al. .................... 252/67 |

(Continued)

FOREIGN PATENT DOCUMENTS

DE    41 05 956 A1    8/1992

(Continued)

OTHER PUBLICATIONS

Jerry March, "Advanced Organic Chemistry", (McGraw-Hill series in advanced chemistry) Bibliography: p. QD251 M315a, QD251.2. M37 (1977) 547 76-16100 ISBN 0-07-040247-7 pp. 344-346, 349, 351-353, 394-395.

*Primary Examiner* — Ellen McAvoy
*Assistant Examiner* — Vishal Vasisth
(74) *Attorney, Agent, or Firm* — Oblon, Spivak, McClelland, Maier & Neustadt, L.L.P.

(57) ABSTRACT

The invention relates to a refrigerator oil composition for compression refrigerators with carbon dioxide refrigerant therein, such as car air conditioners, refrigerators, freezers, air conditioners, heat pumps, etc. The base oil of the composition comprises an oxygen-containing organic compound as the essential component and has a kinematic viscosity at 100° C. of from 5 to 50 mm$^2$/sec, a viscosity index of at least 60, and a water content of at most 300 ppm.

3 Claims, 2 Drawing Sheets

U.S. PATENT DOCUMENTS

| | | |
|---|---|---|
| 6,193,906 B1 | 2/2001 | Kaneko et al. |
| 6,263,683 B1 | 7/2001 | Tazaki |
| 6,267,907 B1 * | 7/2001 | Tolfa et al. .................. 252/68 |
| 6,306,803 B1 | 10/2001 | Tazaki |
| 6,322,719 B2 | 11/2001 | Kaneko et al. |
| 6,354,094 B2 | 3/2002 | Tazaki |
| 6,475,405 B1 * | 11/2002 | Kawaguchi et al. ........... 252/68 |
| 6,613,725 B1 | 9/2003 | Tazaki |
| 6,759,373 B2 | 7/2004 | Tazaki |
| 6,846,430 B2 | 1/2005 | Tazaki |
| 2004/0157753 A1 | 8/2004 | Tazaki et al. |
| 2004/0167042 A1 | 8/2004 | Yamazaki et al. |
| 2005/0116196 A1 | 6/2005 | Tazaki |

FOREIGN PATENT DOCUMENTS

| | | |
|---|---|---|
| DE | 197 19 132 A1 | 11/1998 |
| EP | 0 448 402 A2 | 9/1991 |
| EP | 0 463 773 A2 | 1/1992 |
| EP | 0 537 983 A1 | 4/1993 |
| EP | 992572 | 4/2000 |
| EP | 1 028 156 A1 | 8/2000 |
| JP | 1-198694 | 8/1989 |
| JP | 2-129294 | 5/1990 |
| JP | 06248286 | 9/1994 |
| JP | 9-157219 | 6/1997 |
| JP | 10-46169 | 2/1998 |
| JP | 10-147682 | 6/1998 |
| JP | 2001-198694 | 7/2001 |
| JP | 2001-279289 | 10/2001 |
| JP | 2002-129294 | 5/2002 |
| WO | WO 00/75265 A1 | 12/2000 |

* cited by examiner

REFRIGERATING MACHINE OIL COMPOSITION FOR CARBON DIOXIDE REFRIGERANT

This application is a DIV of 10/406,213 Apr. 4, 2003 U.S. Pat. No. 7,018,961 which is a CON of 10/019,291 Jan. 4, 2002, now abandoned, which is a 371 of PCT/JP00/04143 filed Jun. 23, 2000.

TECHNICAL FIELD

The present invention relates to a refrigerator oil composition for carbon dioxide ($CO_2$) refrigerant. The refrigerator oil composition can be used in compression refrigerators with carbon dioxide refrigerant therein, concretely in refrigerating or heating-cooling equipment such as car air conditioners, refrigerators, freezers, air conditioners, heat pumps, etc.

BACKGROUND ART

In general, a compression refrigeration cycle for refrigerators, for example, that for compression refrigerators comprising a compressor, a condenser, an expansion valve and an evaporator is of a closed system in which is circulated a mixed liquid comprising a refrigerant and a lubricating oil. In compression refrigerators of that type, in general, chlorofluorocarbons such as dichlorodifluoromethane (R-12) and chlorodifluoromethane (R-22) have heretofore been used as refrigerants. Various types of lubricating oils have been produced and used together with such refrigerants. However, when released in air, these Flon compounds that have heretofore been used as refrigerants will bring about environmental pollution, as destroying the ozone layer existing in the stratosphere. Therefore, their use is being severely controlled in all the world. Given the situation, new refrigerants, hydrofluorocarbons and fluorocarbons such as typically 1,1,1,2-tetrafluoroethane (R-134a) have become specifically noted. Hydrofluorocarbons and fluorocarbons will not destroy the ozone layer. However, as their life in air is long, they will cause global warming. Therefore, the recent tendency in the art is toward using refrigerants from natural resources that are free from the problem.

Carbon dioxide is excellent as it is harmless to the environment and is safe to human beings. In addition, it has the advantages of anywhere easy availability and extremely low costs with no necessity for recovery. For these reasons, carbon dioxide has been much used as the refrigerant for refrigerators.

However, using carbon dioxide as a refrigerant is often problematic in that the system with carbon dioxide therein requires higher jetting pressure and has higher temperature, as compared with that where is used R-134a or the like, with the result that the refrigerator oil in the system is exposed to carbon dioxide of being in a supercritical condition. Therefore, $CO_2$-based refrigerators, if lubricated with ordinary lubricating oil, involve unexpected problems in that the lubricating oil used therein is degraded and the machine parts are corroded and undergo copper plating, and, after all, the refrigerators could not be stably driven for long.

The present invention has been made in consideration of the viewpoints noted above, and its object is to provide a refrigerator oil composition which is not degraded, even when used in $CO_2$-based refrigerators, neither corroding the machine parts nor causing copper plating, and therefore ensures stable long-term driving of $CO_2$-based refrigerators.

DISCLOSURE OF THE INVENTION

We, the present inventors have assiduously studied and, as a result, have found that the object of the invention can be effectively attained by using a composition comprising a specific base oil of which the water content is defined not to overstep a predetermined level, or by using such a composition containing a specific additive. On the basis of these findings, we have completed the present invention. Specifically, the invention provides the following:

[1] A refrigerator oil composition for carbon dioxide refrigerant, of which the base oil comprises an oxygen-containing organic compound as the essential component and has a kinematic viscosity at 100° C. of from 5 to 50 mm²/sec, a viscosity index of at least 60, and a water content of at most 300 ppm.

[2] The refrigerator oil composition for carbon dioxide refrigerant of above [1], of which the water content of the base oil is at most 250 ppm.

[3] The refrigerator oil composition for carbon dioxide refrigerant of above [1] or [2], wherein the oxygen-containing organic compound is one or more selected from polyoxyalkylene glycols, polyvinyl ethers, polyesters and carbonates.

[4] The refrigerator oil composition for carbon dioxide refrigerant of above [3], wherein the polyoxyalkylene glycols are represented by the following general formula (I) and the polyvinyl ethers are by the following formula (V):

$$R^1\text{—}[(OR^2)_m\text{—}OR^3]_n \qquad (I)$$

where $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1 to 10 carbon atoms, or an acyl group having from 2 to 10 carbon atom; n represents an integer of from 1 to 6; and m represents a number to give a mean value of m×n falling between 6 and 80;

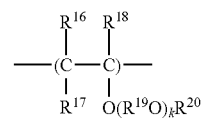

(V)

where $R^{16}$, $R^{17}$ and $R^{18}$ each represent a hydrogen atom, or a hydrocarbon group having from 1 to 8 carbon atoms, and they may be the same or different; $R^{19}$ represents a divalent hydrocarbon group having from 1 to 10 carbon atoms; $R^{20}$ represents a hydrocarbon group having from 1 to 20 carbon atoms; k represents a number from 0 to 10 on average; $R^{16}$ to $R^{20}$ may be the same or different in different structural units; and plural $R^{19}$O's, if any, may be the same or different.

[5] The refrigerator oil composition for carbon dioxide refrigerant of above [3] or [4], wherein the polyesters are polyalcohol esters or polycarboxylates.

[6] The refrigerator oil composition for carbon dioxide refrigerant of any of above [1] to [5], which contains an acid scavenger.

[7] The refrigerator oil composition for carbon dioxide refrigerant of above [6], wherein the acid scavenger is one or more selected from phenyl glycidyl ethers, alkyl glycidyl ethers, alkylene glycol glycidyl ethers, cyclohexene oxides, and α-olefin oxides.

Figure 1:
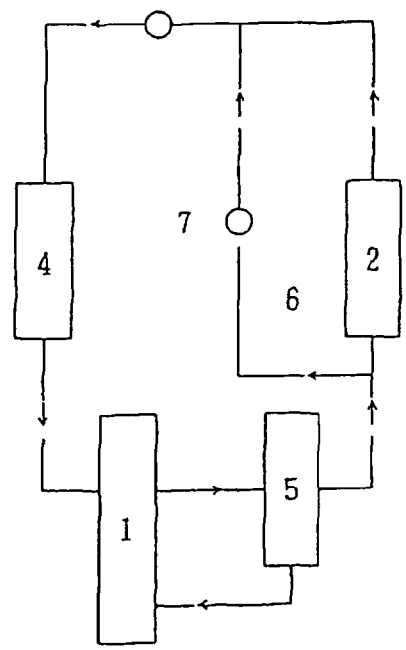
FIG. 1 is a flowchart showing one embodiment of a compression refrigeration cycle in which is accepted the refrigerator oil composition of the invention.

In these, 1 indicates a compressor; 2 indicates a condenser; 3 indicates an expansion valve; 4 indicates an evaporator; 5 indicates an oil separator; 6 indicates a hot gas line; and 7 indicates a hot gas line valve.

BEST MODES OF CARRYING OUT THE INVENTION

Embodiments of the invention are described hereinunder.

The base oil for use in the invention comprises, as the essential component, an oxygen-containing organic compound and has a water content of at most 300 ppm, preferably at most 250 ppm, more preferably at most 200 ppm. Base oil having a water content of larger than 300 ppm will increase the acid component of the refrigerator oil comprising it to thereby promote the degradation of the refrigerator oil and, in addition, it will corrode metallic machine parts and cause copper plating to thereby interfere with the performance of refrigerators. To reduce their water content, for example, oxygen-containing organic compounds such as those mentioned below may be heated in vacuum or may be contacted with silica gel, activated alumina, zeolite or the like. Preferably, they are contacted with zeolite (for example, natural zeolite, or synthetic zeolite such as Molecular Sieves 3A, 4A, 5A, 13X) having a particle size of from 0.1 to 10 nm, more preferably from 0.2 to 5 nm. While contacted with it, they are optionally exposed to ultrasonic waves of from 10 to 50 KHz to enhance the water removal from them.

The base oil for use in the invention of which the essential ingredient is such an oxygen-containing organic compound has a kinematic viscosity at 100° C. of from 5 to 50 mm$^2$/sec, preferably from 7 to 30 mm$^2$/sec, more preferably from 7 to 20 mm$^2$/sec. Base oil having a kinematic viscosity of smaller than 5 mm$^2$/sec could not exhibit good lubricity; and base oil having a kinematic viscosity of larger than 50 mm$^2$/sec will cause power loss and will be useless in practical refrigerators.

The base oil for use in the invention of which the essential ingredient is such an oxygen-containing organic compound has a viscosity index of at least 60, preferably at least 70, more preferably at least 80. Base oil having a viscosity index of smaller than 60 is unfavorable, since its kinematic viscosity is substantially lowered at high temperatures and its lubricity will be poor.

The oxygen-containing organic compound for use in the invention preferably has at least 2 oxygen atoms in the molecule. Concretely, it includes polyoxyalkylene glycols, polyvinyl ethers, polyesters and carbonates, and mixtures of two or more of them are also employable herein. These compounds have good compatibility with carbon dioxide refrigerant to exhibit good lubricity. They are described in detail hereinunder.

(A-1) Polyoxyalkylene Glycols:

Polyoxyalkylene glycols usable herein are, for example, compounds of a general formula (I):

$$R^1\text{—}[(OR^2)_m\text{—}OR^3]_n \quad (I)$$

wherein $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1 to 10 carbon atoms, or an acyl group having from 2 to 10 carbon atom; n represents an integer of from 1 to 6; and m represents a number to give a mean value of m×n falling between 6 and 80.

In formula (I), the alkyl group for $R^1$ and $R^3$ may be linear, branched or cyclic. Specific examples of the alkyl group include a methyl group, an ethyl group, an n-propyl group, an isopropyl group, all types of butyl groups, all types of pentyl groups, all types of hexyl groups, all types of heptyl groups, all types of octyl groups, all types of nonyl groups, all types of decyl groups, a cyclopentyl group, a cyclohexyl group, etc. If the number of carbon atoms constituting the alkyl group is larger than 10, the compatibility of the base oil with refrigerant will be poor and the base oil will be troubled by phase separation from refrigerant. Preferably, the alkyl group has from 1 to 6 carbon atoms.

The alkyl moiety in the acyl group for $R^1$ and $R^3$ may be linear, branched or cyclic. As specific examples of the alkyl moiety in the acyl group, referred to are those with from 1 to 9 carbon atoms mentioned above for the alkyl group. If the number of carbon atoms constituting the acyl group is larger than 10, the compatibility of the base oil with refrigerant will be poor and the base oil will be troubled by phase separation from refrigerant. Preferably, the acyl group has from 2 to 6 carbon atoms.

Where $R^1$ and $R^3$ are both alkyl groups or acyl groups, they may be the same or different.

Where n in formula (I) is 2 or more, plural $R^3$'s in one molecule of the compound may be the same or different.

Where $R^1$ is an aliphatic hydrocarbon group having from 2 to 6 bonding sites and having from 1 to 10 carbon atoms, the aliphatic hydrocarbon group may be linear or cyclic. Examples of the aliphatic hydrocarbon group having 2 bonding sites include an ethylene group, a propylene group, a butylene group, a pentylene group, a hexylene group, a heptylene group, an octylene group, a nonylene group, a decylene group, a cyclopentylene group, a cyclohexylene group, etc. Examples of the aliphatic hydrocarbon group having from 3 to 6 bonding sites include residues to be derived from polyalcohols such as trimethylolpropane, glycerin, pentaerythritol, sorbitol, 1,2,3-trihydroxycyclohexane and 1,3,5-trihydroxycyclohexane, by removing the hydroxyl groups from them.

If the number of carbon atoms constituting the aliphatic hydrocarbon group is larger than 10, the compatibility of the base oil with refrigerant will be poor and the base oil will be troubled by phase separation from refrigerant. Preferably, the aliphatic hydrocarbon group has from 2 to 6 carbon atoms.

Preferably, in the invention, at least one of $R^1$ and $R^3$ is an alkyl group, more preferably having from 1 to 3 carbon atoms. Especially preferred is a methyl group, in view of the viscosity characteristic of the base oil. For the same reason, both $R^1$ and $R^3$ are even more preferably alkyl groups, especially methyl groups.

$R^2$ in formula (I) is an alkylene group having from 2 to 4 carbon atoms. The oxyalkylene group for the repetitive units in formula (I) includes an oxyethylene group, an oxypropylene group, and an oxybutylene group. The oxyalkylene groups in one molecule of the compound may be all the same or different ones. One molecule of the compound may have two or more different types of oxyalkylene groups. Especially preferred herein are copolymers having both oxyethylene (EO) and oxypropylene (PO) groups. In those copolymers, it is desirable that the ratio of EO/(PO+EO) falls between 0.1 and 0.8 in view of the burning load to the refrigerator oil and of the viscosity characteristic of the oil. It is further desirable that the ratio of EO/(PO+EO) falls between 0.3 and 0.6 in view of the moisture absorption of the oil.

In formula (I), n is an integer of from 1 to 6, and shall be defined depending on the number of the bonding sites in $R^1$. For example, where $R^1$ is an alkyl group or an acyl group, n is 1; and where it is an aliphatic hydrocarbon group having 2, 3, 4, 5 or 6 bonding sites, n is 2, 3, 4, 5 or 6, respectively. m is a number to give a mean value of m×n falling between 6 and 80. If the mean value of m×n oversteps the defined range, the object of the invention could not be attained satisfactorily.

Polyoxyalkylene glycols of formula (I) include those having a hydroxyl group at the terminal. Such hydroxyl-terminated compounds could be favorably used in the invention so far as the terminal hydroxyl content of the compounds is not larger than 50 mol % of the total terminal content thereof. If, however, the terminal hydroxyl content thereof is larger than 50 mol %, the moisture absorption of the compounds will increase and the viscosity index thereof will decrease. The compounds having such a large terminal hydroxyl content are unfavorable to the invention.

As the polyoxyalkylene glycols for use in the invention, preferred are polyoxypropylene glycol dimethyl ethers of a general formula:

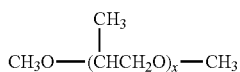

wherein x represents a number of from 6 to 80; and polyoxyethylene-polyoxypropylene glycol dimethyl ethers of a general formula:

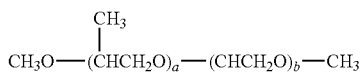

wherein a and b each are at least 1, and their total falls between 6 and 80, in view of the economical aspect of the compounds and of the effect thereof.

Also preferred are polyoxypropylene glycol monobutyl ethers of a general formula:

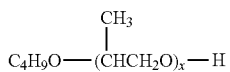

wherein x represents a number of from 6 to 80, as well as polyoxypropylene glycol diacetates, in view of the economical aspect of the compounds.

Polyalkylene glycols of formula (I) are described in detail in JP-A 305893/1990, any of which are employable herein.

Apart from the polyoxyalkylene glycols noted above, further employable herein are polyoxyalkylene glycol derivatives having at least one structural unit of a general formula (II):

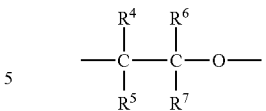

wherein $R^4$ to $R^7$ each represent a hydrogen atom, a monovalent hydrocarbon group having from 1 to 10 carbon atoms, or a group of a general formula (III):

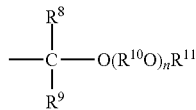

where $R^8$ and $R^9$ each represent a hydrogen atom, a monovalent hydrocarbon group having from 1 to 10 carbon atoms, or an alkoxyalkyl group having from 2 to 20 carbon atoms; $R^{10}$ represents an alkylene group having from 2 to 5 carbon atoms, a substituted alkylene group having an alkyl group as the substituent and having from 2 to 5 carbon atoms in total, or a substituted alkylene group having an alkoxyalkyl group as the substituent and having from 4 to 10 carbon atoms in total; n represents an integer of from 0 to 20; and $R^{11}$ represents a monovalent hydrocarbon group having from 1 to 10 carbon atoms, and at least one of $R^4$ to $R^7$ is the group of formula (III).

In formula (II), $R^4$ to $R^7$ each represent a hydrogen atom, a monovalent hydrocarbon group having from 1 to 10 carbon atoms, or a group of formula (III). The monovalent hydrocarbon group having from 1 to 10 carbon atoms is preferably a monovalent hydrocarbon group having at most 6 carbon atoms, most preferably an alkyl group having at most 3 carbon atoms.

In formula (III), $R^8$ and $R^9$ each represent a hydrogen atom, a monovalent hydrocarbon group having from 1 to 10 carbon atoms, or an alkoxyalkyl group having from 2 to 20 carbon atoms. Preferably, they each are an alkyl group having at most 3 carbon atoms, or an alkoxyalkyl group having at most 6 carbon atoms.

$R^{10}$ represents an alkylene group having from 2 to 5 carbon atoms, a substituted alkylene group having an alkyl group as the substituent and having from 2 to 5 carbon atoms in total, or a substituted alkylene group having an alkoxyalkyl group as the substituent and having from 4 to 10 carbon atoms in total. Preferably, it is an ethylene or substituted ethylene group having at most 6 carbon atoms.

$R^{10}$ represents a monovalent hydrocarbon group having from 1 to 10 carbon atoms. Preferably, it is a hydrocarbon group having at most 6 carbon atoms, more preferably at most 3 carbon atoms.

In formula (II), at least one of $R^4$ to $R^7$ is a group of formula (III). Preferably, either one of $R^4$ and $R^6$ is a group of formula (III), and the remaining one of $R^4$ and $R^6$ and also $R^5$ and $R^7$ each are a hydrogen atom or a monovalent hydrocarbon group having from 1 to 10 carbon atoms.

The polyoxyalkylene glycol derivatives have at least one structural unit of formula (II). More precisely, they include three types of polymers, which are homopolymers each composed of the structural units of formula (II) of one and the same type, copolymers each composed of at least two different types of the structural units of formula (II), and copolymers each comprising the structural units of formula (II) and any other structural units of, for example, a general formula (IV):

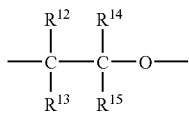
(IV)

wherein $R^{12}$ to $R^{15}$ each represent a hydrogen atom or an alkyl group having from 1 to 3 carbon atoms.

Preferred examples of the homopolymers have from 1 to 200 structural units A of formula (II) and are terminated with any of a hydroxyl group, an acyloxy group having from 1 to 10 carbon atoms, an alkoxy group having from 1 to 10 carbon atoms, or an aryloxy group.

Preferred examples of the copolymers have two different types of structural units A and B each amounting to from 1 to 200 units or have from 1 to 200 structural units A of formula (II) and from 1 to 200 structural units C of formula (III), and are terminated with any of a hydroxyl group, an acyloxy group having from 1 to 10 carbon atoms, an alkoxy group having from 1 to 10 carbon atoms, or an aryloxy group. Various types of these copolymers are employable herein, including, for example, alternate copolymers, random copolymers or block copolymers comprising structural units A, structural units B (and/or structural units C), as well as graft copolymers with a main chain of structural units A as grafted with structural units B.

(A-2) Polyvinyl Ethers:

Polyvinyl ethers for the base oil for use herein may be polyvinyl ether compounds comprising, for example, structural units of a general formula (V):

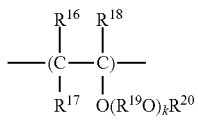
(V)

wherein $R^{16}$, $R^{17}$ and $R^{18}$ each represent a hydrogen atom, or a hydrocarbon group having from 1 to 8 carbon atoms, and they may be the same or different; $R^{19}$ represents a divalent hydrocarbon group having from 1 to 10 carbon atoms; $R^{20}$ represents a hydrocarbon group having from 1 to 20 carbon atoms; k represents a number of from 0 to 10 on average; $R^{16}$ to $R^{20}$ may be the same or different in different structural units; and plural $R^{19}O$'s, if any, may be the same or different.

Also usable herein are polyvinyl ether compounds of block or random copolymers comprising structural units of formula (V) noted above and structural units of the following general formula (VI):

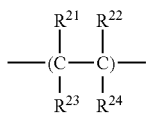
(VI)

wherein $R^{21}$ to $R^{24}$ each represent a hydrogen atom or a hydrocarbon group having from 1 to 20 carbon atoms, and they may be the same or different; and $R^{21}$ to $R^{24}$ may be the same or different in different structural units.

In formula (V), $R^{16}$, $R^{17}$ and $R^{18}$ each represent a hydrogen atom, or a hydrocarbon group having from 1 to 8 carbon atoms, preferably from 14 to carbon atoms, and they may be the same or different. Concretely, the hydrocarbon group includes an alkyl group including, for example, a methyl group, an ethyl group, an n-propyl group, an isopropyl group, an n-butyl group, an isobutyl group, a sec-butyl group, a tert-butyl group, all types of pentyl groups, all types of hexyl groups, all types of heptyl groups, and all types of octyl groups; a cycloalkyl group including, for example, a cyclopentyl group, a cyclohexyl group, all types of methylcyclohexyl groups, all types of ethylcyclohexyl groups, and all types of dimethylcyclohexyl groups; an aryl group including, for example, a phenyl group, all types of methylphenyl groups, all types of ethylphenyl groups, and all types of dimethylphenyl groups; and an arylalkyl group including, for example, a benzyl group, all types of phenylethyl groups, and all types of methylbenzyl groups. Especially preferably, $R^{16}$, $R^{17}$ and $R^{18}$ are all hydrogen atoms.

In formula (V), $R^{19}$ represents a divalent hydrocarbon group having from 1 to 10 carbon atoms, preferably from 2 to 10 carbon atoms. Concretely, the divalent hydrocarbon group having from 1 to 10 carbon atoms includes a divalent aliphatic group including, for example, a methylene group, an ethylene group, a phenylethylene group, a 1,2-propylene group, a 2-phenyl-1,2-propylene group, a 1,3-propylene group, all types of butylene groups, all types of pentylene groups, all types of hexylene groups, all types of heptylene groups, all types of octylene groups, all types of nonylene groups, and all types of decylene groups; an alicyclic group with two bonding sites to be derived from an alicyclic hydrocarbon which includes, for example, cyclohexane, methylcyclohexane, ethylcyclohexane, dimethylcyclohexane, and propylcyclohexane; a divalent aromatic hydrocarbon group including, for example, all types of phenylene groups, all types of methylphenylene groups, all types of ethylphenylene groups, all types of dimethylphenylene groups, and all types of naphthylene groups; an alkylaromatic group to be derived from an alkylaromatic hydrocarbon such as toluene, xylene or ethylbenzene, and having a monovalent bonding site both in the alkyl moiety and in the aromatic moiety; and an alkylaromatic group to be derived from a polyalkylaromatic hydrocarbon such as xylene or diethylbenzene, and having bonding sites in the alkyl moieties. Of those, especially preferred are aliphatic groups having from 2 to 4 carbon atoms.

In formula (V), k indicates the number of the repetitive $R^{19}O$'s, falling between 0 and 10, preferably between 0 and 5 on average. Plural $R^{19}O$'s, if any, may be the same or different.

In formula (V), $R^{20}$ represents a hydrocarbon group having from 1 to 20 carbon atoms, preferably from 1 to 10 carbon atoms concretely, the hydrocarbon group includes an alkyl group including, for example, a methyl group, an ethyl group, an n-propyl group, an isopropyl group, an n-butyl group, an isobutyl group, a sec-butyl group, a tert-butyl group, all types of pentyl groups, all types of hexyl groups, all types of heptyl groups, all types of octyl groups, all types of nonyl groups, and all types of decyl groups; a cycloalkyl group including, for example, a cyclopentyl group, a cyclohexyl group, all types of methylcyclohexyl groups, all types of ethylcyclohexyl groups, all types of propylcyclohexyl groups, and all types of dimethylcyclohexyl groups; an aryl group including, for example, a phenyl group, all types of methylphenyl groups, all types of ethylphenyl groups, all types of dimethylphenyl groups, all types of propylphenyl groups, all types or trimethylphenyl groups, all types of butylphenyl groups, and all types of naphthyl groups; and an arylalkyl group including, for example, a benzyl group, all types of phenylethyl groups, all types of methylbenzyl groups, all types of phenylpropyl groups, and all types of phenylbutyl groups.

$R^{16}$ to $R^{20}$ may be the same or different in different structural units.

Of the polyvinyl ether compounds (1) of formula (V), preferred are those in which the ratio by mol of carbon/oxygen falls between 4.2 and 7.0. If the molar ratio is smaller than 4.2, the moisture absorption of the compounds will be high; but if larger than 7.0, the compatibility of the compounds with refrigerant will be poor.

In formula (VI), $R^{21}$ to $R^{24}$ each represent a hydrogen atom or a hydrocarbon group having from 1 to 20 carbon atoms, and they may be the same or different. For examples of the hydrocarbon group having from 1 to 20 carbon atoms, referred to are the same as those mentioned hereinabove for $R^{20}$ in formula (V). $R^{21}$ to $R^{24}$ may be the same or different in different structural units.

Of the polyvinyl ether compounds (2) of block or random copolymers comprising structural units of formula (V) and structural units of formula (VI), preferred are those in which the ratio by mol of carbon/oxygen falls between 4.2 and 7.0. If the molar ratio is smaller than 4.2, the moisture absorption of the compounds will be high; but if larger than 7.0, the compatibility of the compounds with refrigerant will be poor.

In the invention, further employable are mixtures of the polyvinyl ether compound (1) and the polyvinyl ether compound (2).

Those polyvinyl ether compounds (1) and (2) may be produced through polymerization of vinyl ether monomers corresponding thereto, or through copolymerization of hydrocarbon monomers having olefinic double bonds and corresponding thereto with vinyl ether monomers also corresponding thereto.

Also preferably, the polyvinyl ether compounds for use in the invention are specifically terminated in the manner mentioned below. As one preferred example of the terminal structure of the compounds, one end of the molecule is terminated with a group of a general formula (VII) or (VIII):

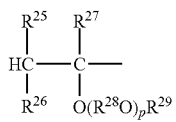
(VII)

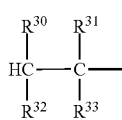
(VIII)

wherein $R^{25}$, $R^{26}$ and $R^{27}$ each represent a hydrogen atom or a hydrocarbon group having from 1 to 8 carbon atoms, and they may be the same or different; $R^{30}$, $R^{31}$, $R^{32}$ and $R^{33}$ each represent a hydrogen atom or a hydrocarbon group having from 1 to 20 carbon atoms, and they may be the same or different; $R^{28}$ represents a divalent hydrocarbon group having from 1 to 10 carbon atoms; $R^{29}$ represents a hydrocarbon group having from 1 to 20 carbon atoms; p represents a number of from 0 to 10 on average; and plural $R^{28}O$'s, if any, may be the same or different, and the other end thereof is terminated with a group of a general formula (IX) or (X):

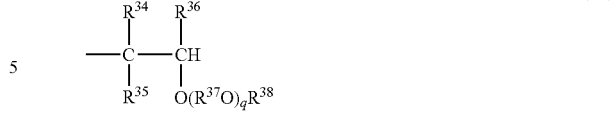
(IX)

(X)

wherein $R^{34}$, $R^{35}$ and $R^{36}$ each represent a hydrogen atom or a hydrocarbon group having from 1 to 8 carbon atoms, and they may be the same or different; $R^{39}$, $R^{40}$, $R^{41}$ and $R^{42}$ each represent a hydrogen atom or a hydrocarbon group having from 1 to 20 carbon atoms, and they may be the same or different; $R^{37}$ represents a divalent hydrocarbon group having from 1 to 10 carbon atoms; $R^{38}$ represents a hydrocarbon group having from 1 to 20 carbon atoms; q represents a number of from 0 to 10 on average; and plural $R^{37}O$'s, if any, may be the same or different.

As another preferred example of the terminal structure of the compounds, one end of the molecule is terminated with a group of formula (VII) or (VIII) as above and the other end thereof is terminated with a group of a general formula (XI):

(XI)

wherein $R^{43}$, $R^{44}$ and $R^{45}$ each represent a hydrogen atom or a hydrocarbon group having from 1 to 8 carbon atoms, and they may be the same or different.

Of those polyvinyl ether compounds, especially preferred herein are the following:

(1) Compounds comprising structural units of formula (V) and terminated with a group of formula (VII) or (VIII) at one end and with a group of formula (IX) or (X) at the other end, in which $R^{16}$, $R^{17}$ and $R^{18}$ in the unit of formula (V) are all hydrogen atoms, k is a number of from 0 to 4, $R^{19}$ is a divalent hydrocarbon group having from 2 to 4 carbon atoms, and $R^{20}$ is a hydrocarbon group having from 1 to 20 carbon atoms.

(2) Compounds composed of structural units of formula (V) only and terminated with a group of formula (VII) at one end and with a group of formula (IX) at the other end, in which $R^{16}$, $R^{17}$ and $R^{18}$ in the unit of formula (V) are all hydrogen atoms, k is a number of from 0 to 4, $R^9$ is a divalent hydrocarbon group having from 2 to 4 carbon atoms, and $R^{20}$ is a hydrocarbon group having from 1 to 20 carbon atoms.

(3) Compounds comprising structural units of formula (V) and terminated with a group of formula (VII) or (VIII) at one end and with a group of formula (XI) at the other end, in which $R^{16}$, $R^{17}$ and $R^{18}$ in the unit of formula (V) are all hydrogen atoms, k is a number of from 0 to 4, $R^{19}$ is a divalent hydrocarbon group having from 2 to 4 carbon atoms, and $R^{20}$ is a hydrocarbon group having from 1 to 20 carbon atoms.

(4) Compounds composed of structural units of formula (V) only and terminated with a group of formula (VII) at one end and with a group of formula (X) at the other end, in which $R^{16}$, $R^{17}$ and $R^{18}$ in the unit of formula (V) are all hydrogen atoms, k is a number of from 0 to 4, $R^{19}$ is a divalent hydrocarbon group having from 2 to 4 carbon atoms, $R^{20}$ is a divalent hydrocarbon group having from 1 to 20 carbon atoms, and $R^{20}$ is a hydrocarbon group having from 1 to 20 carbon atoms.

In the invention, also usable are polyvinyl ether compounds comprising structural units of formula (V) and terminated with a group of formula (VII) noted above at one end and with a group of the following general formula (XII) at the other end:

(VII)

wherein $R^{46}$, $R^{47}$ and $R^{48}$ each represent a hydrogen atom or a hydrocarbon group having from 1 to 8 carbon atoms, and they may be the same or different; $R^{49}$ and $R^{51}$ each represent a divalent hydrocarbon group having from 2 to 10 carbon atoms, and they may be the same or different; $R^{50}$ and $R^{52}$ each represent a hydrocarbon group having from 1 to 10 carbon atoms, and they may be the same or different; c and d each represent a number of from 0 to 10 on average, and they may be the same or different; and plural $R^{49}O$'s, if any, may be the same or different, and plural $R^{51}O$'s, if any, may also be the same or different.

Further usable herein are polyvinyl ether compounds of homopolymers or copolymers of alkyl vinyl ethers, which comprise structural units of a general formula (XIII) or (XIV):

(XIII)

(XIV)

wherein $R^{53}$ represents a hydrocarbon group having from 1 to 8 carbon atoms,
and have a weight-average molecular weight of from 300 to 5,000, and of which one end is terminated with a group of a general formula (XV) or (XVI):

(XV)

(XVI)

wherein $R^{54}$ represents an alkyl group having from 1 to 3 carbon atoms; and $R^{55}$ represents a hydrocarbon group having from 1 to 8 carbon atoms.

Some polyvinyl ethers are described in detail in JP-A 128578/1994, JP-A 234814/1994, JP-A 234815/1994 and JP-A 113196/1996, all of which are usable herein.

(A-3) Polyesters:

Polyesters for use in the invention include <1> polyalcohol esters, and <2> polycarboxylates.

<1> Polyalcohol Esters:

The polyalcohol esters are esters of polyalcohols with monocarboxylic acids, encompassing complex esters of polyalcohols with mixed fatty acids of monocarboxylic acids and polycarboxylic acids.

Typical examples of the polyalcohol esters are esters of aliphatic polyalcohols with linear or branched fatty acids.

The aliphatic polyalcohols for the esters include, for example, ethylene glycol, propylene glycol, butylene glycol, neopentyl glycol, trimethylolethane, ditrimethylolethane, trimethylolpropane, ditrimethylolpropane, glycerin, pentaerythritol, dipentaerythritol, tripentaerythritol, and sorbitol.

The fatty acids may have from 3 to 12 carbon atoms. As preferred examples of the fatty acids, mentioned are propionic acid, butyric acid, pivalic acid, valeric acid, caproic acid, heptanoic acid, octanoic acid, nonanoic acid, decanoic acid, dodecanoic acid, isovaleric acid, neopentanoic acid, 2-methylbutyric acid, 2-ethylbutyric acid, 2-methylhexanoic acid, 2-ethylhexanoicacid, isooctanoicacid, isononanoicacid, isodecanoic acid, 2,2-dimethyloctanoic acid, 2-butyloctanoic acid, and 3,5,5-trimethylhexanoic acid. Semiesters of aliphatic polyalcohols with linear or branched fatty acids are also employable herein.

As the esters of aliphatic polyalcohols with linear or branched fatty acids, especially preferred are esters of pentaerythritol, dipentaerythritol or tripentaerythritol with fatty acids having from 5 to 12 carbon atoms, more preferably from 5 to 9 carbon atoms, such as valeric acid, hexanoic acid, heptanoic acid, 2-methylhexanoic acid, 2-ethylhexanoic acid, isooctanoic acid, isononanoic acid, isodecanoic acid, 2,2-dimethyloctanoic acid, 2-butyloctanoic acid, and 3,5,5-trimethylhexanoic acid.

Also usable herein are complex esters composed of semiesters of aliphatic polyalcohols with linear or branched C3-9 fatty acids, and aliphatic dibasic acids or aromatic dibasic acids. For such complex esters, preferred are C5-7 fatty acids, more preferably C5-6 fatty acids. The fatty acids of that type include valeric acid, hexanoic acid, isovaleric acid, 2-methylbutyric acid, 2-ethylbutyric acid, and their mixtures. Especially preferred are mixtures of a C5 fatty acid and a C6 fatty acid as mixed in a ratio by weight falling between 10/90 and 90/10. Along with those fatty acids, used are aliphatic dibasic acids for esterification with polyalcohols. The aliphatic dibasic acids include succinic acid, adipic acid, pimelic acid, suberic acid, azelaic acid, sebacic acid, undecane-diacid, dodecane-diacid, tridecane-diacid, and docosane-diacid. Also usable are aromatic dibasic acids, including phthalic acid and isophthalic acid. The esterification for preparing the complex esters comprises reacting a polyalcohol with a dibasic acid in a predetermined ratio to give a semiester followed by reacting the resulting semiester with a fatty acid, or the order of reacting a polyalcohol with a dibasic acid and a fatty acid may be reversed, or a dibasic acid and a fatty acid may be mixed and reacted both at a time with a polyalcohol for the intended esterification.

Also preferred for use herein are polyalcohol esters to be prepared by reacting an acid fluoride of a general formula (XVII):

(XVII)

wherein $R^{56}$ to $R^{58}$ each represent an alkyl group having from 1 to 13 carbon atoms, provided that the alkyl group having 4 or more carbon atoms shall have at least one branch and that the total of the carbon atoms constituting $R^{56}$ to $R^{58}$ shall fall between 3 and 23,
with a polyalcohol, as their moisture absorption to saturation is low (see JP-A 157219/1997).

<2> Polycarboxylates:

Polycarboxylates are usable herein, which are esters of polycarboxylic acids with a monoalcohol or its derivative (monoalcohols) and encompass complex esters of polycarboxylic acids with mixed alcohols of monoalcohols and polyalcohols. The polycarboxylates of the type include aliphatic or aromatic polycarboxylates, and alicyclic polycarboxylates.

Examples of the aliphatic or aromatic polycarboxylates are dialkyl esters aliphatic or aromatic dicarboxylic acids (having from 16 to 22 carbon atoms).

The aliphatic dicarboxylic acids include, for example, succinic acid, glutaric acid, adipic acid, pimelic acid, suberic acid, azelaic acid, sebacic acid, undecane-diacid, dodecane-diacid, tridecane-diacid, and docosane-diacid; and the aromatic dicarboxylic acids include, for example, phthalic acid, and isophthalic acid. The alcohol components for the esters may be of C5-8 alcohols, including, for example, amyl alcohol, hexyl alcohol, heptyl alcohol, and octyl alcohol. Preferred examples of the esters are dioctyl adipate, diisoheptyl adipate, dihexyl sebacate, diheptyl succinate, dioctyl phthalate, diisoheptyl phthalate, and diisoamyl phthalate.

Aliphatic or aromatic, tri- or higher poly-carboxylates are also usable herein, for which tri- or higher polycarboxylic acids include, for example, aliphatic polycarboxylic acids such as 1,2,3,4-butane-tetracarboxylic acid, and aromatic polycarboxylic acids such as trimellitic acid, and pyromellitic acid. The alcohol components for the esters may be monoalcohols with a linear or branched C3-12 alkyl group, or polyalkylene glycol monoalcohols of a formula, $H-(R'O)_n-R$ in which $R'$ indicates a C2-8 alkylene group, R indicates a C1-10 alkyl group, and n is an integer of from 1 to 10. Herein usable are polycarboxylates to be prepared by esterifying the polycarboxylic acids mentioned above with alcohols such as those also mentioned above, as well as complex esters to be prepared by reacting those polycarboxylic acids with those alcohols and further with other polyalcohols such as ethylene glycol or propylene glycol for esterification.

Alicyclic polycarboxylates are also usable herein, which may be represented by the following general formula (XVIII):

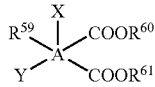

(XVIII)

wherein A represents a cyclohexane ring or a cyclohexene ring; $R^{59}$ represents a hydrogen atom or a methyl group; X represents a hydrogen atom or $COOR^{62}$; Y represents a hydrogen atom or $COOR^{63}$; and $R^{60}$ to $R^{61}$ each indicate a C3-18 alkyl group or a C3-10 cycloalkyl group, and they may be the same or different.

These esters may be prepared by esterifying a predetermined acid component with a predetermined alcohol component in any ordinary manner, but preferably in an inert gas atmosphere of nitrogen gas or the like, in the presence or absence of an esterification catalyst, and under heat with stirring the components.

The acid component includes cycloalkane-polycarboxylic acids, cycloalkene-polycarboxylic acids and their anhydrides. One or more of those compounds may be used either singly or as combined, for the acid component. Concretely mentioned are 1,2-cyclohexane-dicarboxylic acid, 4-cyclohexene-1,2-dicarboxylic acid, 1-cyclohexene-1,2-dicarboxylic acid, 1,3-cyclohexane-dicarboxylic acid, 1,4-cyclohexane-dicarboxylic acid, 3-methyl-1,2-cyclohexane-dicarboxylic acid, 4-methyl-1,2-cyclohexane-dicarboxylic acid, 3-methyl-4-cyclohexene-1,2-dicarboxylic acid, 4-methyl-4-cyclohexene-1,2-dicarboxylic acid, 1,2,4-cyclohexane-tricarboxylic acid, 1,3,5-cyclohexane-tricarboxylic acid, 1,2,4,5-cyclohexane-tetracarboxylic acid, and their anhydrides. Of those, preferred are 1,2-cyclohexane-dicarboxylic acid, 3-methyl-1,2-cyclohexane-dicarboxylic acid, 4-methyl-1,2-cyclohexane-dicarboxylic acid, 4-cyclohexene-1,2-dicarboxylic acid, 3-methyl-4-cyclohexene-1,2-dicarboxylic acid, 4-methyl-4-cyclohexene-1,2-dicarboxylic acid, and their anhydrides.

The alcohol component includes linear or branched aliphatic C3-18 alcohols, and alicyclic C3-10 alcohols.

Specific examples of the linear aliphatic alcohols are n-propyl alcohol, n-butanol, n-pentanol, n-hexanol, n-heptanol, n-octanol, n-nonanol, n-decanol, n-undecanol, n-dodecanol, n-tetradecanol, n-hexadecanol, n-octadecanol.

Specific examples of the branched aliphatic alcohols are isopropanol, isobutanol, sec-butanol, isopentanol, isohexanol, 2-methylhexanol, 2-methylheptanol, isoheptanol, 2-ethylhexanol, 2-octanol, isooctanol, 3,5,5-trimethylhexanol, isodecanol, isoundecanol, isotridecanol, isotetradecanol, isohexadecanol, isooctadecanol, 2,6-dimethyl-4-heptanol.

Specific examples of the alicyclic alcohols are cyclohexanol, methylcyclohexanol, dimethylcyclohexanol.

Of those alicyclic polycarboxylates to be prepared from such polycarboxylic acids and alcohols, especially preferred are diisobutyl 1,2-cyclohexane-dicarboxylate, dicyclohexyl 1,2-cyclohexane-dicarboxylate, diisoheptyl 1,2-cyclohexane-dicarboxylate, di(2-ethylhexyl)1,2-cyclohexane-dicarboxylate, di(3,5,5-trimethylhexyl)1,2-cyclohexane-dicarboxylate, di(2,6-dimethyl-4-heptyl)1,2-cyclohexane-dicarboxylate, diisodecyl 1,2-cyclohexane-dicarboxylate, diisoundecyl 1,2-cyclohexane-dicarboxylate, dicyclohexyl 4-cyclohexene-1,2-dicarboxylate, diisoheptyl 4-cyclohexene-1,2-dicarboxylate, di(2-ethylhexyl)4-cyclohexene-1,2-dicarboxylate, di(3,5,5-trimethylhexyl)4-cyclohexene-1,2-dicarboxylate, di(3,5,5-trimethylhexyl)3-methyl-1,2-cyclohexane-dicarboxylate, di(3,5,5-trimethylhexyl) 4-methyl-1,2-cyclohexane-dicarboxylate, di(3,5,5-trimethylhexyl) 3-methyl-4-cyclohexene-1,2-dicarboxylate, di(3,5, 5-trimethylhexyl)4-methyl-4-cyclohexene-1,2-dicarboxylate, and tetra(3,5,5-trimethylhexyl)1,2,4,5-cyclohexane-tetracarboxylate.

The alicyclic polycarboxylates may be mixed with any other esters (hereinafter these are referred to as additional esters), with which their physical balance including volume-specific resistivity and viscosity could be improved. The additional esters include adipates, azelates, sebacates, phthalates, trimellitates, and polyalcohol esters. The polyalcohol component for the polyalcohol esters includes, for example, neopentyl glycol, trimethylolpropane, pentaerythritol, dipentaerythritol. The acid component for them includes, for example, isobutyric acid, 2-ethylbutyric acid, isovaleric acid, pivalic acid, cyclohexanecarboxylic acid, 2-methylpentanoic acid, 2-ethylpentanoic acid, 2-methylhexanoic acid, 2-ethylhexanoic acid, 3,5,5-trimethylhexanoic acid.

Apart from <1> and <2> mentioned above, further employable herein are diesters to be prepared by esterifying monoalcohol-alkylene oxide adducts with aliphatic dicarboxylic acids such as adipic acid, pimelic acid, suberic acid, azelaic acid, sebacic acid, undecane-diacid, dodecane-diacid, or docosane-diacid, or with aromatic dicarboxylic acids such as phthalic acid. Still further employable are esters to be prepared by esterifying polyalcohol-alkylene oxide (1 to 10 mols) adducts in which the polyalcohol may be, for example, glycerin or trimethylolpropane, with C3-12 fatty acids such as propionic acid, butyric acid, valeric acid, hexanoic acid, heptanoic acid, octanoic acid, nonanoic acid, decanoic acid, dodecanoic acid, 2-methylhexanoic acid, 2-ethylhexanoic acid, isooctanoic acid, isononanoic acid, isodecanoic acid, 2,2-dimethyloctanoic acid, or 2-butyloctanoic acid.

<3> Other Polyesters:

Still other polyesters employable herein are fumarate oligomers and hydroxypivalates.

The fumarate oligomers may be homopolymers of fumarates or copolymers of fumarates with unsaturated aliphatic hydrocarbons, and may be represented by a general formula (XIX):

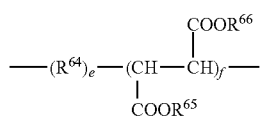
(XIX)

wherein $R^{64}$ represents an alkylene group, a substituted alkylene group, or an alkylene oxide group; $R^{65}$ and $R^{66}$ each represent a C1-9 alkyl group, an allyl group, or a terminal-substituted or unsubstituted polyalkylene oxide group, and these may be the same or different; e is 0 or an integer of at least one, f is an integer of at least one; and $R^{70}$ is not larger than 50 mol % of the oligomer.

Concretely mentioned are diethyl fumarate oligomers and dibutyl fumarate oligomers.

In formula (XIX), both terminals are of residues of the polymerization initiator used in polymerization to give the oligomers, and are not shown.

Also mentioned are alkyl fumarate copolymers comprising from 1 to 50 mol % of structural units of a formula (XX):

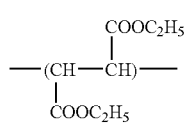
(XX)

and from 50 to 99 mol % of structural units of a general formula (XXI):

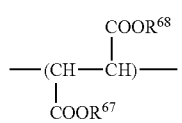
(XXI)

wherein $R^{67}$ and $R^{68}$ each represent a C3-8 alkyl group, and they may be the same or different.

The hydroxypivalates may be represented by a general formula (XXII):

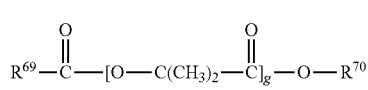
(XXII)

wherein $R^{69}$ and $R^{70}$ each represent a C2-10 alkyl group, and g is an integer of from 1 to 5.

(A-4) Carbonates:

Carbonates for use herein include compounds of a general formula (XXIII):

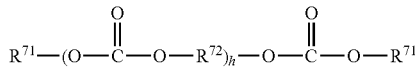
(XXIII)

wherein $R^{71}$ represents a C2-10 alkyl group; $R^{72}$ represents a C2-10 alkylene or cycloalkylene group; and h is an integer of from 1 to 4, and compounds of a general formula (XXIV):

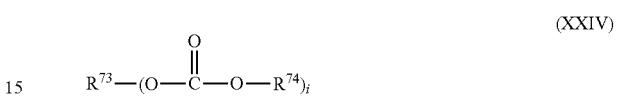
(XXIV)

wherein $R^{73}$ represents a hydroxyl group-having C2-6 polyalcohol residue; $R^{74}$ represents a C2-10 alkyl group; and i is an integer of from 2 to 6.

Those carbonates may be prepared by interesterifying dimethyl carbonate with alcohols in the presence of a basic catalyst.

Also usable herein are compounds of a general formula (XXV):

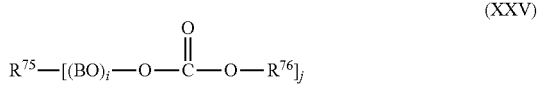
(XXV)

wherein $R^5$ represents a C1-10 alkyl group; $R^6$ represents a C2-10 alkyl group; j is an integer of from 2 to 10; l is an integer of from 2 to 100; and —BO— represents —$CH_2$—$CH(CH_3)$—O— or —$CH_2$—$CH_2$—O—.

The carbonates may be prepared, for example, by reacting carbonic acid with alkylene oxides. In those, the alkylene oxide moiety added to the carbonate moiety may be from a single ethylene oxide or a single propylene oxide or may also be from their mixture.

Of the oxygen-containing compounds of (A-1) to (A-4), especially preferred are those of (A-1) and (A-2) as stable.

The base oil for use in the invention may comprise one and the same type of or two or more different types of the oxygen-containing compounds of (A-1) to (A-4) either singly or as combined. For example, it may comprise one compound (A-1), or may comprise two or more of the same type of the compounds (A-1), or may even comprise two or more of different types of compounds (A-1) and (A-2), either singly or as combined.

The base oil shall comprise any of the compounds (A-1) to (A-4) as the essential component, but, if desired, it may optionally contain a minor amount of any other compounds of, for example, mineral oils, hydrocarbons such as poly-α-olefins, monoesters, etc.

Preferably, the refrigerator oil composition of the invention contains an acid scavenger. Combined with an acid scavenger, the oxygen-containing compound having a reduced water content in the composition is more effective for protecting refrigerator oil from being degraded and for protecting metallic machine parts from being corroded.

The acid scavenger usable herein includes, for example, epoxy compounds such as phenyl glycidyl ethers, alkyl glycidyl ethers, alkylene glycol glycidyl ethers, cyclohexene oxides, α-olefin oxides, and epoxidated soybean oils. Of those, preferred are phenyl glycidyl ethers, alkyl glycidyl ethers, alkylene glycol glycidyl ethers, cyclohexene oxides and α-olefin oxides, in view of their compatibility with base oil.

The alkyl group in the alkyl glycidyl ethers and the alkylene group in the alkylene glycol glycidyl ethers may be branched, and the number of carbon atoms constituting the group falls generally between 3 and 30, preferably between 4 and 24, more preferably between 6 and 16. The number of all carbon atoms constituting the α-olefin oxide falls generally between 4 and 30, preferably between 4 and 24, more preferably between 6 and 16.

The refrigerator oil composition of the invention may contain one or more of those acid scavengers either singly or as combined. The acid scavenger content of the refrigerator oil composition preferably falls between 0.005 and 5% by weight relative to the base oil. If the content is smaller than 0.005% by weight, the acid scavenger could not exhibit its acid-scavenging capabilities. On the other hand, if the content is larger than 5% by weight, the acid scavenger will cause sludge formation in the refrigerator oil composition.

If desired, the refrigerator oil composition of the invention may further contain any known additives, for example, an extreme pressure agent such as phosphates (e.g., tricresyl phosphate, TCP) orphosphites (e.g., trisnonylphneylphosphite, dioleyl hydrogenphosphite); a phenol-type antioxidant such as 2,6-di-tert-butyl-4-methylphenol or an amine-type antioxidant such as phenyl-α-naphthylamine; a copper inactivator such as benzotriazole, N—[N,N'-di(C3-12)alkylaminomethyl]tolutriazoles; and a defoaming agent such as silicone oil or fluorosilicone oil. Also if desired, it may contain any other additives of, for example, load reduction improver, chlorine scavenger, detergent dispersant, viscosity index improver, oil, rust inhibitor, corrosion inhibitor and pour point depressant. The amount of the additives in the composition of the invention generally falls between 0.01 and 10% by weight.

The carbon dioxide refrigerant referred to herein indicates any and every one comprising carbon dioxide as the essential component, and it may contain any additional refrigerant components of, for example, hydrocarbons such as propane or isobutane; ammonia; Flons such as hydrofluorocarbons and fluorocarbons, typically 1,1,1,2-tetrafluoroethane (R-134a). Even though the refrigerant contains any such additional components but so far as it comprises carbon dioxide as the essential component, the refrigerator oil composition of the invention is effective thereto and produces good results when applied thereto.

In the method of using the refrigerator oil composition of the invention for lubricating refrigerators, it is desirable that the ratio of the carbon dioxide-based refrigerant to be combined with the refrigerator oil composition to the refrigerator oil, refrigerant/refrigerator oil composition, falls between 99/1 and 10/90 by weight. If the amount of the refrigerant is smaller than the defined range, the refrigerating capabilities of the refrigerator oil composition combined with the refrigerant will be poor. If, on the other hand, the amount of the refrigerant is larger than that range, the lubricating capabilities of the refrigerator oil composition will be poor. Anyhow, the amount of the refrigerant overstepping the defined range is unfavorable. For these reasons, the ratio by weight of refrigerant/refrigerator oil composition more preferably falls between 95/5 and 30/70.

Figure 2:
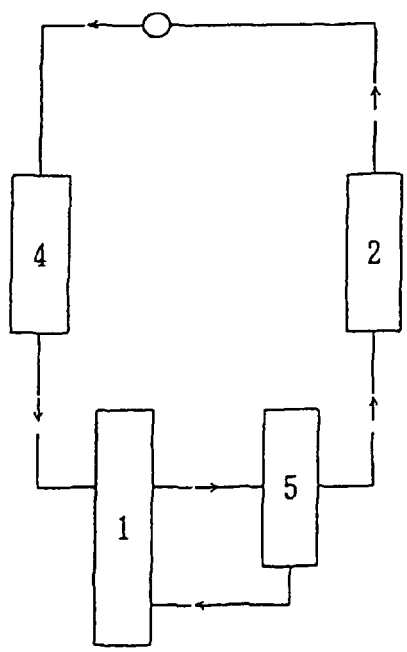
FIG. 2 is a flowchart showing another embodiment of a compression refrigeration cycle in which is accepted the refrigerator oil composition of the invention.
Figure 3:
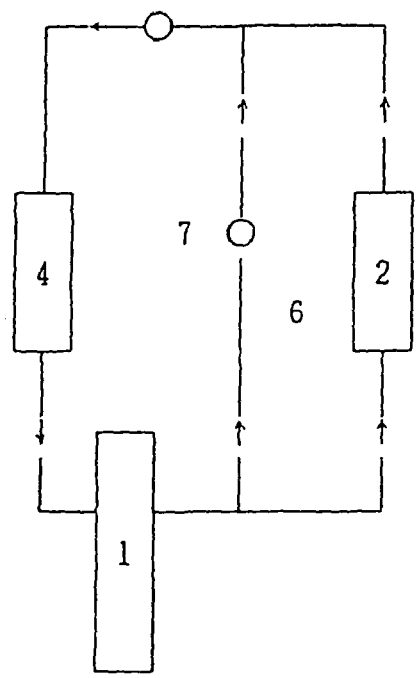
FIG. 3 is a flowchart showing still another embodiment of a compression refrigeration cycle in which is accepted the refrigerator oil composition of the invention.
Figure 4:
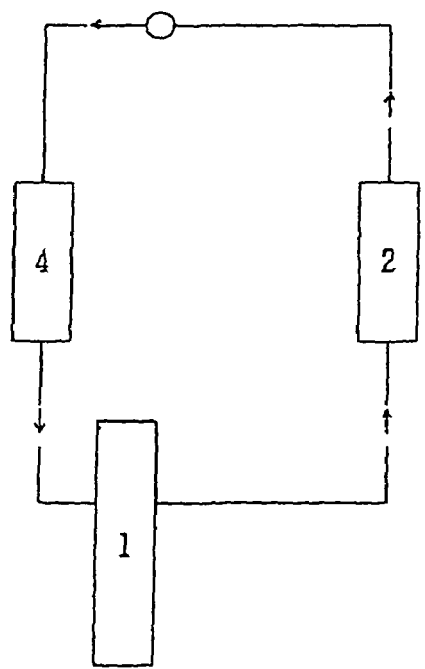
FIG. 4 is a flowchart showing still another embodiment of a compression refrigeration cycle in which is accepted the refrigerator oil composition of the invention.

The refrigerator oil composition of the invention is applicable to various types of refrigerators, and is especially suitable to the compression refrigeration cycle for compression refrigerators. In particular, the refrigerator oil composition of the invention exhibits its effects more effectively, when applied to compression refrigeration cycles equipped with an oil separator and/or a hot gas line, such as those illustrated in FIG. 1 to 3 attached hereto. As a rule, a compression refrigeration cycle comprises compressor-condenser-expansion valve-evaporator. The lubricating oil for refrigerators generally has good compatibility with the refrigerant for them. However, when a carbon dioxide-based refrigerant is used in the refrigeration cycle as above and when the refrigerator is lubricated with ordinary refrigerator oil, the ability of the oil to prevent machine parts from being worn away will be often poor and the stability of the oil will be also poor. As a result, it is often impossible to use the refrigerator oil for a long period of time. In particular, this tendency is noticeable when the refrigerator oil is used in refrigeration cycles for electric refrigerators or small-sized air conditioners in which a capillary tube is used as the expansion valve. In that situation, the refrigerator oil composition of the invention is still effective even in driving a compression refrigeration cycle equipped with an oil separator and/or a hot gas line, for which is used a carbon dioxide-based refrigerant.

The invention is described in more detail with reference to the following Examples.

Examples 1 to 8, and Comparative Examples 1 to 9

Oxygen-containing organic compounds shown in Table 1 were tested for the stability in carbon dioxide refrigerant. In the stability test, the total acid value increase was measured. To every sample, added was 1.2% by weight of an acid scavenger, α-olefin oxide. The test result is given in Table 2.

In Table 1, polypropylene glycol polycarbonates of sample Nos. XVII and XVIII were prepared according to the method of Examples 3 and 2, respectively, of JP-A 8725/1992.

The details of the stability test are as follows:

[Stability Test]

40 g of an oil sample, 40 g of carbon dioxide refrigerant gas, and a metal catalyst of copper, aluminium and iron were put into a 120 ml autoclave, to which was added water to make the system have a water content of 2000 ppm. The autoclave was sealed, and kept at 175° C. for 10 days. After thus left, the oil sample was analyzed. During the experiment, the inner pressure was kept at 15 MPa.

TABLE 1

| No. | Sample | Kinematic Viscosity at 100° C. (mm²/s) | Viscosity Index | Water Content (ppm) |
|---|---|---|---|---|
| I | PAG-A*1 | 10.9 | 212 | 500 |
| II | PAG-A dehydrate | — | — | 150 |
| III | PAG-A hydrate | — | — | 3000 |
| IV | PAG-B*2 dehydrate | 20.5 | 218 | 220 |
| V | PAG-B hydrate | — | — | 1900 |
| VI | PAG-C*3 dehydrate | 9.7 | 185 | 250 |
| VII | PAG-C hydrate | — | — | 3500 |
| VIII | PAG-D*4 dehydrate | 14.7 | 94 | 170 |
| IX | PAG-D hydrate | — | — | 2600 |
| X | PVE*5 dehydrate | 9.8 | 86 | 70 |
| XI | PVE hydrate | — | — | 5000 |
| XII | POE-A*6 | 14.7 | 94 | 550 |
| XIII | POE-A dehydrate | — | — | 80 |
| XIV | POE-A hydrate | — | — | 2200 |
| XV | POE-B*7 dehydrate | 9.1 | 92 | 240 |
| XVI | POE-B hydrate | — | — | 2500 |
| XVII | PC-A*8 dehydrate | 13.0 | 120 | 200 |
| XVIII | PC-B*9 dehydrate | 10.2 | 118 | 150 |

Every sample in the table contains 1.2% by weight of an acid scavenger, α-olefin oxide.
*1 polyoxypropylene glycol dimethyl ether
*2 polyoxyethylene-oxypropylene glycol dimethyl ether [EO:PO = 2:8 by mol]
*3 polyoxypropylene glycol monomethyl ether
*4 polyoxyethylene-oxypropylene glycol mono-n-butyl ether [EO:PO = 1:9 by mol]
*5 polyethyl vinyl ether/polyisobutyl vinyl ether [9:1 by mol] copolymer
*6 pentaerythritol/2-ethylhexanoic acid + 3,5,5-trimethylhexanoic acid [2:8 by mol]
*7 pentaerythritol/3,5,5-trimethylhexanoic acid
*8 polypropylene glycol polycarbonate
*9 polypropylene glycol polycarbonate

TABLE 2

| | Sample No. | Stability Test | | | Total Acid Value Increase (mgKOH/g) |
|---|---|---|---|---|---|
| | | Appearance of Oil | Precipitate | Metal Catalyst | |
| Comp. Ex. 1 | I | good | no | brown spots found (aluminium plate) | 0.05 |
| Ex. 1 | II | good | no | no change | 0.01 |
| Comp. Ex. 2 | III | pale yellow | no | brown spots found (aluminium plate) | 0.10 |
| Ex. 2 | IV | good | no | no change | 0.01 |
| Comp. Ex. 3 | V | good | no | brown spots found (aluminium plate) | 0.12 |
| Ex. 3 | VI | good | no | no change | 0.02 |
| Comp. Ex. 4 | VII | pale yellow | no | copper plating (small) | 0.16 |
| Ex. 4 | VIII | good | no | no change | 0.02 |
| Comp. Ex. 5 | IX | pale yellow | no | brown spots found (aluminium plate) | 0.18 |
| Ex. 5 | X | good | no | no change | 0.01 or less |
| Comp. Ex. 6 | XI | good | no | brown spots found (aluminium plate) | 0.08 |
| Comp. Ex. 7 | XII | pale yellow | no | brown spots found (aluminium plate) | 0.06 |
| Ex. 6 | XIII | good | no | no change | 0.03 |
| Comp. Ex. 8 | XIV | pale yellowish brown | yes | copper plating (medium) | 1.45 |
| Ex. 7 | XV | good | no | no change | 0.02 |
| Comp. Ex. 9 | XVI | pale yellowish brown | yes | copper plating (great) | 2.37 |
| Ex. 8 | XVII | good | no | no change | 0.03 |
| Ex. 9 | XVII | good | no | no change | 0.02 |

INDUSTRIAL APPLICABILITY

The refrigerator oil composition for carbon dioxide refrigerant of the invention is stable even in a supercritical carbon dioxide atmosphere. Its total acid value increase is small, and it degrades little. In addition, it is effective for preventing metal corrosion and copper plating.

What is claimed is:

1. A method of lubricating a refrigerator, the method comprising lubricating the refrigerator with a refrigerator oil composition, comprising a base oil and a carbon dioxide refrigerant, wherein the base oil is polyoxyalkylene glycol and has a kinematic viscosity at 100° C. of from 9.7 to 20.5 mm²/sec, a viscosity index of 94 to 218, and a water content of 150 to 250 ppm,
wherein the polyoxyalkylene glycol is represented by the following general formula (I):

$$R^1\text{—}[(OR^2)_m\text{—}OR^3]_n \qquad (I)$$

where $R^1$ represents a hydrogen atom, an alkyl group having from 1 to 10 carbon atoms, an acyl group having from 2 to 10 carbon atoms, or an aliphatic hydrocarbon group having from 2 to 6 bonding sites and having from 1 to 10 carbon atoms; $R^2$ represents an alkylene group having from 2 to 4 carbon atoms; $R^3$ represents a hydrogen atom, an alkyl group having from 1 to 10 carbon atoms, or an acyl group having from 2 to 10 carbon atom; n represents 1; and m represents a number to give a mean value of m×n falling between 6 and 80.

2. The method of claim 1, wherein the base oil further comprises at least one selected from the group consisting of a polyester and a carbonate.

3. The method of claim 1, further comprising at least one acid scavenger selected from the group consisting of phenyl glycidyl ether, alkyl glycidyl ether, alkylene glycol glycidyl ether, cyclohexene oxide and α-olefin oxide.

* * * * *